United States Patent
Scriffignano et al.

(10) Patent No.: US 10,621,182 B2
(45) Date of Patent: Apr. 14, 2020

(54) SYSTEM AND PROCESS FOR ANALYZING, QUALIFYING AND INGESTING SOURCES OF UNSTRUCTURED DATA VIA EMPIRICAL ATTRIBUTION

(71) Applicant: THE DUN & BRADSTREET CORPORATION, Short Hills, NJ (US)

(72) Inventors: Anthony J. Scriffignano, West Caldwell, NJ (US); Yiem Sunbhanich, Lewis Center, OH (US); Robin Fry Davies, Plymouth, MI (US); Warwick Matthews, Glen Iris (AU)

(73) Assignee: THE DUN & BRADSTREET CORPORATION, Short Hills, NJ (US)

( * ) Notice: Subject to any disclaimer, the term of this patent is extended or adjusted under 35 U.S.C. 154(b) by 636 days.

(21) Appl. No.: 14/844,623

(22) Filed: Sep. 3, 2015

(65) Prior Publication Data

US 2016/0063001 A1    Mar. 3, 2016

Related U.S. Application Data

(60) Provisional application No. 62/045,398, filed on Sep. 3, 2014.

(51) Int. Cl.
*G06F 16/2457*    (2019.01)
*G06F 17/22*    (2006.01)

(52) U.S. Cl.
CPC .... *G06F 16/24578* (2019.01); *G06F 17/2211* (2013.01)

(58) Field of Classification Search
CPC .......................... G06F 17/2211; G06F 17/3053
See application file for complete search history.

(56) References Cited

U.S. PATENT DOCUMENTS 6,438,632 B1    8/2002 Kikugawa
7,778,849 B1    8/2010 Hutton et al.
(Continued)

FOREIGN PATENT DOCUMENTS

| JP | 11-259389 A | 9/1999 |
| JP | 2009-294836 | 12/2009 |
| RU | 2480822 | 4/2013 |
| WO | 2009/029903 | 3/2009 |

OTHER PUBLICATIONS

International Preliminary Report on Patentability dated Sep. 16, 2016 from corresponding International Application No. PCT/US15/48322, 19 pages.
(Continued)

*Primary Examiner* — Taelor Kim
(74) *Attorney, Agent, or Firm* — Ohlandt, Greeley, Ruggiero & Perle, L.L.P.

(57) ABSTRACT

There is provided a method that includes (a) receiving data from a data source, (b) attributing the data source in accordance with rules, thus yielding an attribute, (c) analyzing the data to identify a confounding characteristic in the data, (d) calculating a qualitative measure of the attribute, thus yielding a weighted attribute, (e) calculating a qualitative measure of the confounding characteristic, thus yielding a weighted confounding characteristic, (f) analyzing the weighted attribute and the weighted confounding characteristic, to produce a disposition, (g) filtering the data in accordance with the disposition, thus yielding extracted data, and (h) transmitting the extracted data to a downstream process. There is also provided a system that executes the method, and a storage device that contains instructions for controlling a processor to perform the method.

15 Claims, 4 Drawing Sheets

(56) References Cited

U.S. PATENT DOCUMENTS

| | | | |
|---|---|---|---|
| 2002/0010679 A1 | 1/2002 | Felsher | |
| 2004/0034699 A1 | 2/2004 | Gotz et al. | |
| 2005/0108630 A1 | 5/2005 | Wasson et al. | |
| 2005/0187923 A1 | 8/2005 | Cipollone | |
| 2007/0127482 A1* | 6/2007 | Harris | G06F 7/02 370/392 |
| 2008/0072290 A1* | 3/2008 | Metzer | G06F 17/30348 726/3 |
| 2008/0208820 A1 | 8/2008 | Usey et al. | |
| 2008/0256070 A1 | 10/2008 | Inglis | |
| 2010/0179930 A1* | 7/2010 | Teller | G06N 20/00 706/12 |
| 2010/0332424 A1* | 12/2010 | Bhattacharya | G06N 5/02 706/12 |
| 2012/0123767 A1 | 5/2012 | Ananthanarayanan et al. | |
| 2016/0042359 A1* | 2/2016 | Singh | G06Q 30/016 704/2 |

OTHER PUBLICATIONS

International Search Report dated Dec. 7, 2015 from corresponding PCT/US2015/048322, pp. 3.

International Written Opinion dated Dec. 7, 2015 from corresponding PCT/US2015/048322, pp. 6.

Japanese Office Action dated Jun. 5, 2018 from corresponding Japanese Patent Application No. JP2017-512333, 9 pages.

Akamine et al, "Stepwise Selection of Analysis Target Page For Large-Scale Web Information Analysis", The Association for Natural Language Processing, 17th Annual Meeting, Collection of Presented Papers, Mar. 7, 2011, pp. 41-44 (B1-3).

Gruhl et al., "Multimodal social intelligence in a real-time dashboard system", VLDB Journal, Springer Verlag, Berlin, DE, vol. 19, No. 6, Dec. 1, 2010, pp. 825-848.

Nagarajan, "Understanding User-Generated Content on Social Media", Dissertation submitted in partial fulfillment of the requirements for the degree of Doctor of Philosophy, Aug. 18, 2010, URL:https://etd.ohiolink.edu/letd.send_file?accession=wright1284152205&disposition=inline, 210 pgs.

Extended European Search Report dated Feb. 1, 2018 from corresponding European Patent Application 15837731.7, 13 pages.

Russian Office Action dated Jun. 8, 2018 from corresponding Russian Patent Application 2017110788, 21 pages.

Japanese Office Action dated Jun. 11, 2019 from corresponding Japanese Patent Application 2017-512333, 11 pages.

* cited by examiner

SYSTEM AND PROCESS FOR ANALYZING, QUALIFYING AND INGESTING SOURCES OF UNSTRUCTURED DATA VIA EMPIRICAL ATTRIBUTION

CROSS-REFERENCE TO RELATED APPLICATIONS

The present application is claiming priority of U.S. Provisional Patent Application Ser. No. 62/045,398, filed on Sep. 3, 2014, the content of which is herein incorporated by reference.

BACKGROUND OF THE DISCLOSURE

1. Field of the Disclosure

The present disclosure relates to a system that employs new, empirical, i.e., scientific and reproducible, attribution and discrimination processes, also referred to herein as capabilities, to generate descriptive and contextual attributes of data from poorly curated or poorly structured, unstructured or semi-structured sources, and in particular, social media sources. The attributes are then used to characterize, vet, discriminate and ultimately make decisions about the most appropriate disposition or treatment of the data, using methods that are beyond existing recursive-perfective processes and modalities. An inherent problem that this disclosure addresses is the current impossibility of consistently vetting, adjudicating, and ingesting data at scale when there is not a sufficient ontology or canonical form to structure an ingestion and curation process.

The capability described herein could be utilized in processing of data acquired from files, downloaded directly from online sources or in response to an inquiry initiated by an end-user, a system, an application, or any other method that provides data to be ingested, processed and used for some purpose. In this case, "processed and used for some purpose" may be any downstream system or function that exploits the data, and that will benefit from the capability, that is, derive inference, aid in the observation of patterns, perform better, faster, more efficiently or in a manner that tends to increase the value of that data in the context of that system or function.

This capability may operate at a context level, source file level, or content level and may be informed by the collected experience of previous iterations of the process itself "Context level" attribution operates at the level of the circumstances surrounding the acquisition and ingestion of the data source. "Source file level" attribution typically, but not exclusively, operates at the level of the file of data as supplied by or acquired from a source. "Content level" attribution operates at the base data level and is typically, but not exclusively, based on analysis of individual data elements and/or relationships between them.

An example of "context level" attribution would be creation of metadata to describe the frequency at which data from a particular source is delivered and the "shelf life" of the data in that source, that is, how long the data will typically be considered to be "current". An example of "source file level" attribution would be to examine metadata from the file itself, for example, creation date. An example of "content level" attribution would be detection of writing system used to represent the data, for example Simplified Chinese.

Industry estimates indicate that more than 80% of new data creation is unstructured. In order to derive sufficient value from data that will increasingly be in unstructured or only loosely understood formats, or conversely to avoid the accretion of data that ultimately proves to be inaccurate, misleading or detrimental if added to an extant curated corpus of data or fed into a particular use-case, such as a decision-making business function, it is important to be able to pre-screen that data against significant, but not necessarily predetermined, criteria, and/or measured along known dimensions. A benefit of the pre-screening is that data that fails certain tests or does not score at a sufficiently high level of quality will then be rejected, and risk of detrimental effect mitigated. An additional benefit would be to assist or even direct curation efforts when resource constraints or other considerations do not allow for ingestion of all available sources of new data. Note that the word "quality" is used here to mean any measure of fitness for a particular purpose and does not necessarily imply particular inherent value.

Various technologies have emerged to perform disambiguation and discrimination functions on unstructured data including:
a) Entity extraction—deriving the individual components of interest from text, such as nouns, verbs, and modifiers.
b) Sentiment analysis—ascribing attribution to the intended tone and emotion of the content.
c) Semantic disambiguation—reducing the text to more computable constructs (for example, tokenization).
d) Linguistic transformation—including transliteration, translation, and interpretation through natural language processing (NLP).

The above-noted risk and need to mitigate applies particularly where the data itself is social media data, which invariably has a major unstructured, or "free text", component, is of limited size, is "crowd-sourced", that is, sourced from an unbounded set of unverified participants, and which is likely to contain one or more "confounding characteristics".

Some examples of these confounding characteristics are:
a) Sarcasm: Words or predicates juxtaposed in such a way as to convey hidden meaning that is opposed to that which comes from cursory interpretation.
   Example: XYZ Oil Co. is an excellent company to do business with, if you like destroying nature.
b) Neologism: Words or phrases which are newly constructed and taken collectively to have some shared meaning.
   Example:—Hashtags
c) Grammar variations or inappropriately phrased text: Word usage which is intentionally or unintentionally incorrect, leading to ambiguous or non-dispositive interpretation.
   Example: FBI is Hunting Terrorists With Explosives
d) Punctuation: Usage of punctuation in a non-standard or inconsistent way, or lack of punctuation, leading to ambiguous or contradictory interpretation.
   Example: "Eats shoots and leaves" vs. "Eats, shoots, and leaves"
e) Polylingual data: Insertion of words and phrases from a foreign language. Includes official, unofficial and informal loan-words, loan-phrases, and calques.
   Example: He had a certain je ne sais quoi that made it difficult to understand his meaning completely.
f) Spelling: Invented, incorrect, or adopted spelling that results in inconsistent, incorrect, or non-dispositive interpretation
   Example: RU There?
g) Obfuscation/Encryption: The intentional transformation of data to confound inference or interpretation h) Context: Increased dependency on external continuity or externally held context because of lack of context provided in the data itself Example: "He had an awesome slice!" [Cake? Pizza? Tennis shot?]

i) Multimedia: text and other media forms are combined in one message or piece of data to create meaning which is ambiguous or unknowable without understanding of the totality.

Example: Picture accompanied by "This is what we think of XYZ Beverage Co.'s new flavor!"

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

Existing systems may attempt to perform the abovementioned functions (entity extraction, sentiment analysis, semantic disambiguation, linguistic transformation and so on) and thus measure and test data, but it is very difficult to know what tests and metrics to employ without a priori experience with data from a particular source. Therefore in order to produce sufficiently effective and reproducible levels of discrimination and decision-making, systems that seek to ingest unstructured data, social media and other like data may do so in a recursive manner, where the system can be reconfigured based on prior experience. Such systems may also implement closed-loop, also known as "feedback to host", scenarios, using ex post facto quality feedback to influence future outcomes. However, these systems encounter limitations in scalability and automation because the implementation is invariably manual, and even when "machine learning" is employed, it is only at the most basic experiential level, i.e., based on frequency and semantic analysis of the detailed data itself. Limitations also exist due to the impact of confounding characteristics of language described above.

SUMMARY OF THE DISCLOSURE

There is provided a method that includes (a) receiving data from a data source, (b) attributing the data source in accordance with rules, thus yielding an attribute, (c) analyzing the data to identify a confounding characteristic in the data, (d) calculating a qualitative measure of the attribute, thus yielding a weighted attribute, (e) calculating a qualitative measure of the confounding characteristic, thus yielding a weighted confounding characteristic, (f) analyzing the weighted attribute and the weighted confounding characteristic, to produce a disposition, (g) filtering the data in accordance with the disposition, thus yielding extracted data, and (h) transmitting the extracted data to a downstream process. There is also provided a system that executes the method, and a storage device that contains instructions for controlling a processor to perform the method.

The techniques described herein include capabilities that are not addressed by the prior art. Specifically, the techniques described herein provide a methodology that uses new dimensions of attribution, which in turn enable new automated implementations of data ingestion decision-making, allowing the construction of systems that are faster, more scalable, more flexible and more consistent than possible using approaches based on the prior art.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
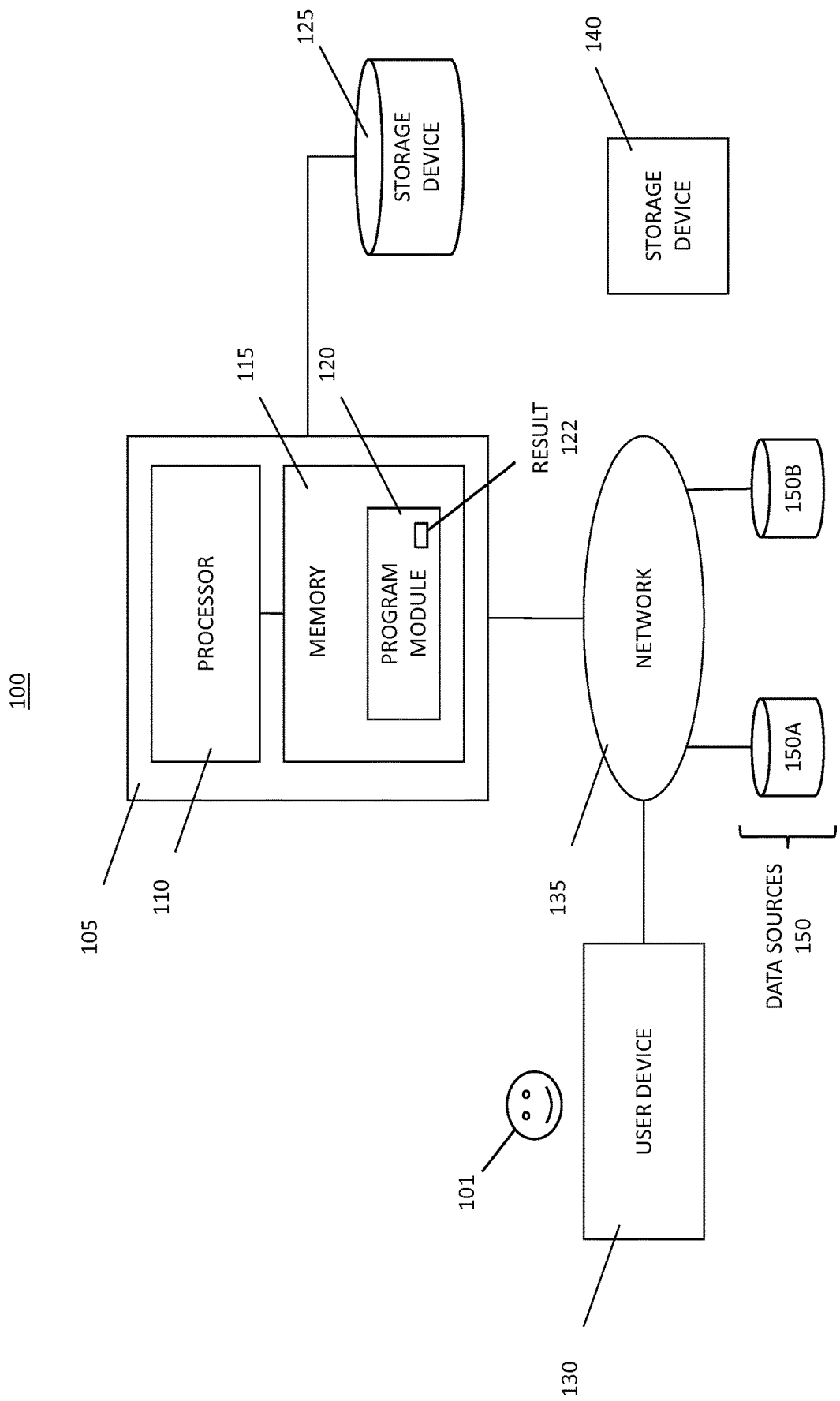
FIG. 1 is a block diagram of a system for ingesting, attributing, creating disposition strategies and exporting data sources via empirical attribution.

There is a need to improve existing processes that seek to analyze and qualify data sources prior to ingestion. To fulfill this need, there is provided a system that performs a method that includes (a) ascribing attributes to incoming data, from a source, at multiple levels, (b) creating disposition rules to extract a qualifying subset of data, if any, from the source, based on criteria that measure the ascribed attributes over a number of dimensions, thus yielding qualified data, (c) ingesting the qualified data, and (d) obtaining feedback and, and effecting a change in the system based on the feedback.

Thus the present document discloses an automated system and method for ascribing attributes to source data, making decisions based, inter alia, on the attributes, ingesting the data, and obtaining feedback based on the system's experience of the ingestion (which experience would be recorded by the system and stored as new attributes of the process itself). The method is performed without human intervention, thereby allowing for consistency and scalability, and allowing humans to focus on situations where insight or additional research is required to affect appropriate data stewardship. The term "scalability" means that this approach is not limited to a specific technology or technical solution.

In the following several paragraphs, there are definitions of several terms being used herein.

Attribute: When used as a verb, this term means the calculation and association of metadata (i.e., descriptive data) or other data (e.g., experiential data) to extant data. The data attached in this way are "attributes".

Corpus: The substantive part of a thing, such as a data file, as distinct from data about that thing such as the date it was created. Corpus refers, unless otherwise clear from the context, to the entirety of the thing.

Curation: The classification, transformation, storage and management of a thing, namely data in the present disclosure.

Ingestion: The taking in and storage of data. The process of ingestion usually involves transformation or refactoring into a target format or taxonomy.

Empirical attribution: The attribution of attributes based on scientific method. In the case of the present disclosure, algorithmic and mathematical processes.

Methodology:

1. Select a number of data sources based on an agreed criteria to be established considering factors such as:
    a. Availability of data including cost and permissible use;
    b. Content richness, ability to observe sufficient examples to form empirical conclusions;
    c. Degree of overlap with pre-existing sources already included in study; and
    d. Known bias in the data source.

2. Construct an automated or manual/hybrid A/B/C test to measure:
   a. Existence;
   b. Dispositive attribution; and
   c. Degree of observation across extrapolated universe.
3. Execute test and evaluate results including:
   a. Simple descriptive statistics; and
   b. Basic visualizations.
4. Measures of bias such as optimism/pessimism of evaluators.
5. Form a conclusion about the degree to which each of the hypotheses is observed and the impact on overall evaluation against the remainder of the universe that does not exhibit the hypothetical criteria.

Evaluation of Results:
a. Assess the impact of each of the hypotheses against the samples selected.
b. Assuming we can prove relevance, develop a scoring system to rate different sources according to the hypothetical dimensions.

There may be additional confounding aspects which emerge during the observation period, such as:
   a. Implications of other languages;
   b. Impact of the homogeneity of the group speaking;
   c. Shared metaphor among the group speaking (either introduced by the environment or by shared experience);
   d. Borrowed words from one language to another; and
   e. Multimodality of speakers (e.g., native speakers vs. non-native speakers, digital natives vs. digital immigrants).

The study of social media is part of a broader investigation into unstructured data. The overall effort is part of ongoing development of capabilities in the discovery, curation and synthesis of data pertinent to businesses and to people in the context of business.

The primary focus of the present disclosure is on capabilities that contribute to an overall understanding of total risk and/or total opportunity. Adjacent needs relate to statutory compliance, independence and ethics, and detection of malfeasance.

FIG. 1 is a block diagram of a system 100, for ingesting, attributing, creating disposition strategies and exporting data sources via empirical attribution. System 100 includes a computer 105 coupled to a network 135.

Network 135 is a data communications network. Network 135 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, or (f) the Internet. Communications are conducted via network 135 by way of electronic signals and optical signals.

Computer 105 includes a processor 110, and a memory 115 coupled to processor 110. Although computer 105 is represented herein as a standalone device, it is not limited to such, but instead can be coupled to other devices (not shown) in a distributed processing system.

Processor 110 is an electronic device configured of logic circuitry that responds to and executes instructions.

Memory 115 is a tangible computer-readable storage medium encoded with a computer program. In this regard, memory 115 stores data and instructions, i.e., program code, that are readable and executable by processor 110 for controlling the operation of processor 110. Memory 115 may be implemented in a random access memory (RAM), a hard drive, a read only memory (ROM), or a combination thereof. One of the components of memory 115 is a program module 120.

Program module 120 contains instructions for controlling processor 110 to execute processes described herein. In the present document, although we describe operations being performed by computer 105, or by a method or a process or its subordinate processes, the operations are actually being performed by processor 110.

The term "module" is used herein to denote a functional operation that may be embodied either as a stand-alone component or as an integrated configuration of a plurality of subordinate components. Thus, program module 120 may be implemented as a single module or as a plurality of modules that operate in cooperation with one another. Moreover, although program module 120 is described herein as being installed in memory 115, and therefore being implemented in software, it could be implemented in any of hardware (e.g., electronic circuitry), firmware, software, or a combination thereof.

While program module 120 is indicated as already loaded into memory 115, it may be configured on a storage device 140 for subsequent loading into memory 115. Storage device 140 is a tangible computer-readable storage medium that stores program module 120 thereon. Examples of storage device 140 include a compact disk, a magnetic tape, a read only memory, an optical storage media, a hard drive or a memory unit consisting of multiple parallel hard drives, and a universal serial bus (USB) flash drive. Alternatively, storage device 140 can be a random access memory, or other type of electronic storage device, located on a remote storage system (not shown) and coupled to computer 105 via network 135.

System 100 also includes a data source 150A and a data source 150B, which are collectively referred to herein as data sources 150, and communicatively coupled to network 135. In practice, data sources 150 may include any number of data sources, i.e., one or more data sources. Data sources 150 contain unstructured data, and may include social media.

System 100 also includes a user device 130 that is operated by a user 101 and coupled to computer 105 via network 135. User device 130 includes an input device, such as a keyboard or speech recognition subsystem, for enabling user 101 to communicate information and command selections to processor 110. User device 130 also includes an output device such as a display or a printer, or a speech synthesizer. A cursor control such as a mouse, track-ball, or touch-sensitive screen, allows user 101 to manipulate a cursor on the display for communicating additional information and command selections to processor 110.

Processor 110 outputs, to user device 130, a result 122 of an execution of the program module 120. Alternatively, processor 110 could direct the output to a storage device 125, e.g., a database or a memory, or a remote device (not shown) via network 135.

The workflow within which system 100 is applicable relates to the receipt, discovery and curation of unstructured data sources, e.g., data sources 150. This receipt, discovery and curation could be part of an exercise serving any number of use cases, including, but not limited to, forming opinions about collective sentiment in social media, understanding shifts in marketing posture with regard to claims made, detecting nuance leading to the discovery of identity theft or other malfeasance, inference of social signals portending an upcoming event or behavior, or simply evaluating the incremental value of ingesting a new unstructured source into a pre-existing process.

Figure 2:
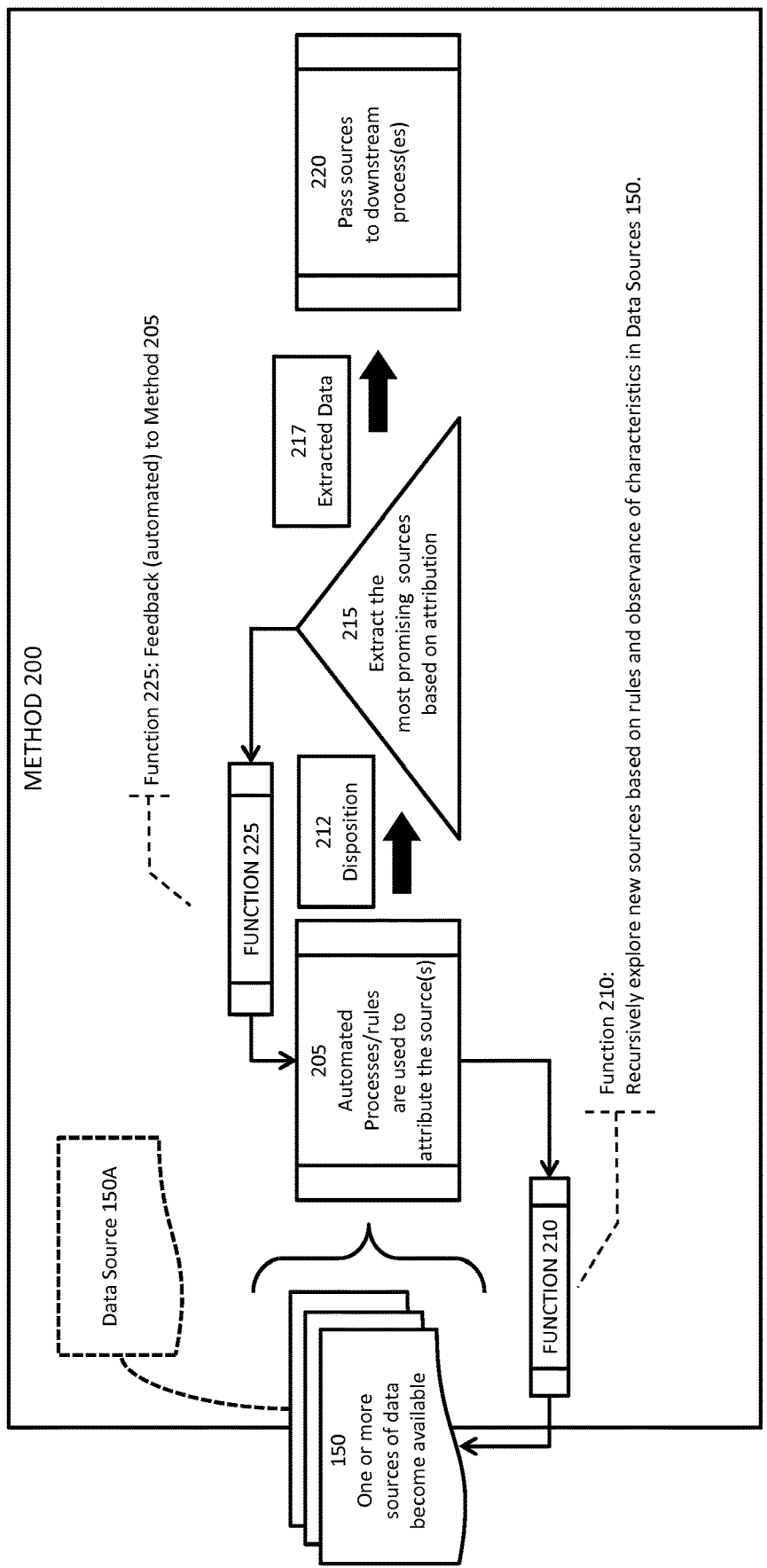
FIG. 2 is a functional block diagram of a method that is performed by the system of FIG. 1.

FIG. 2 is a functional block diagram of a method 200 that is performed by system 100, and more specifically, by processor 110 in accordance with program module 120. Method 200 is the overall process of receiving data, attributing data sources and their data at multiple levels (that is, the aforementioned context level, source level and content level) and making decisions as to the disposition of the data sources and data, transmission of the data, e.g., particular subsets of it, to one or more downstream systems, initiation of functions to provide feedback about the disposition, and functions to initiate discovery and intake of additional data sources. Method 200 accesses and processes data from one or more of sources 150, but for ease of explanation, we shall henceforth describe the execution of method 200 using an example of a single data source, namely data source 150A. Method 200 commences with process 205.

Process 205 accesses, analyses and attributes data source 150A at multiple levels, namely "Context", "Source File" and "Content" levels, as mentioned above, and decides upon a most appropriate disposition of the data contained in data source 150A to yield a disposition 212.

Figure 3:
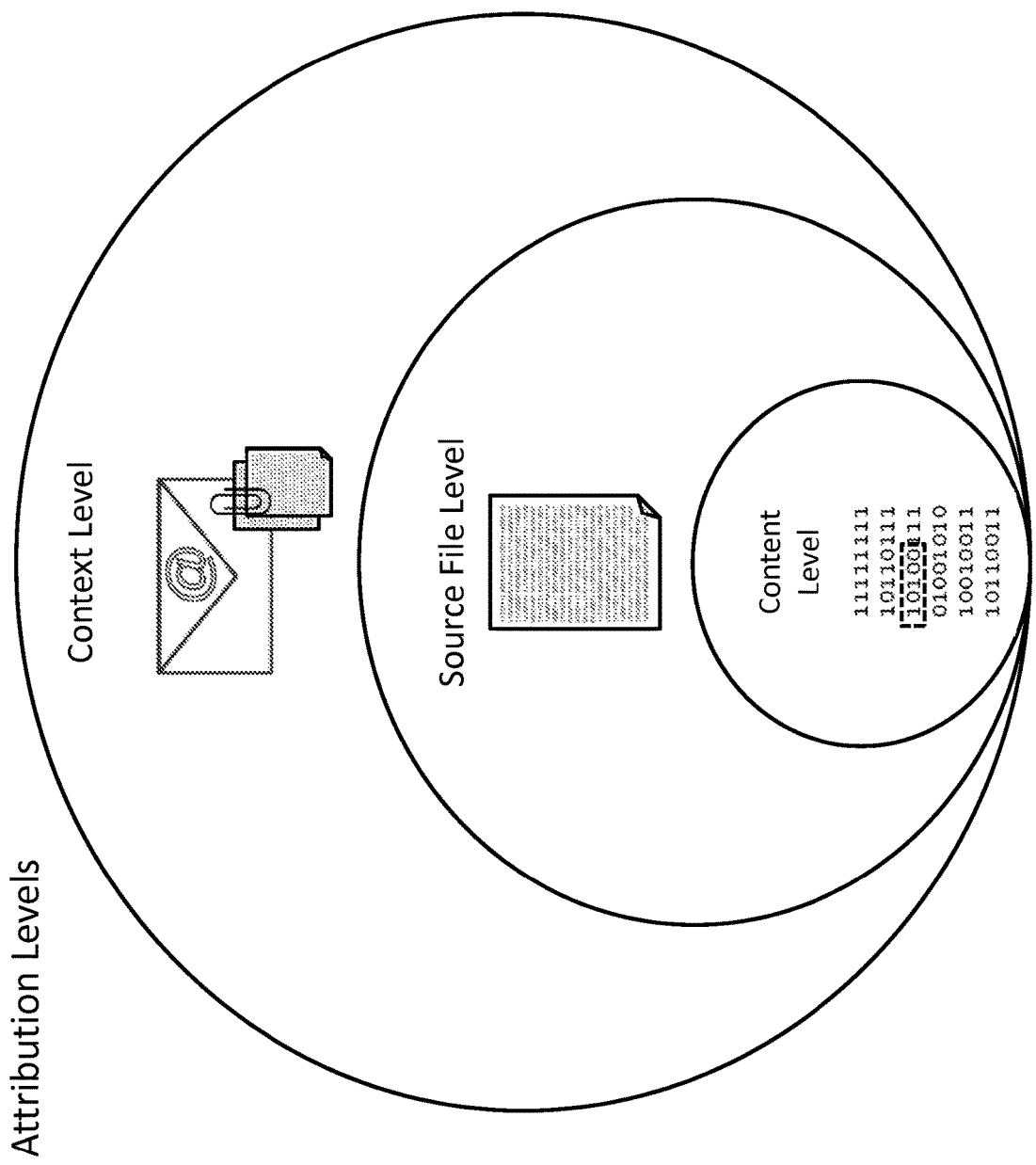
FIG. 3 is a graphical representation of source attribution levels and their hierarchical relationship.

FIG. 3 is a graphical representation of source attribution levels and their hierarchical relationship.

At any source attribution level, and in particular at the Content level, attribution may include disambiguation and discrimination functions that operate in the dimensions described above, i.e., entity extraction, sentiment analysis, semantic disambiguation, and linguistic transformation. Furthermore, using these disambiguation and discrimination functions, process 205 will attempt to resolve challenges to attribution caused inter alia by the confounding characteristics described above, i.e., sarcasm, neologism, etc.

Figure 4:
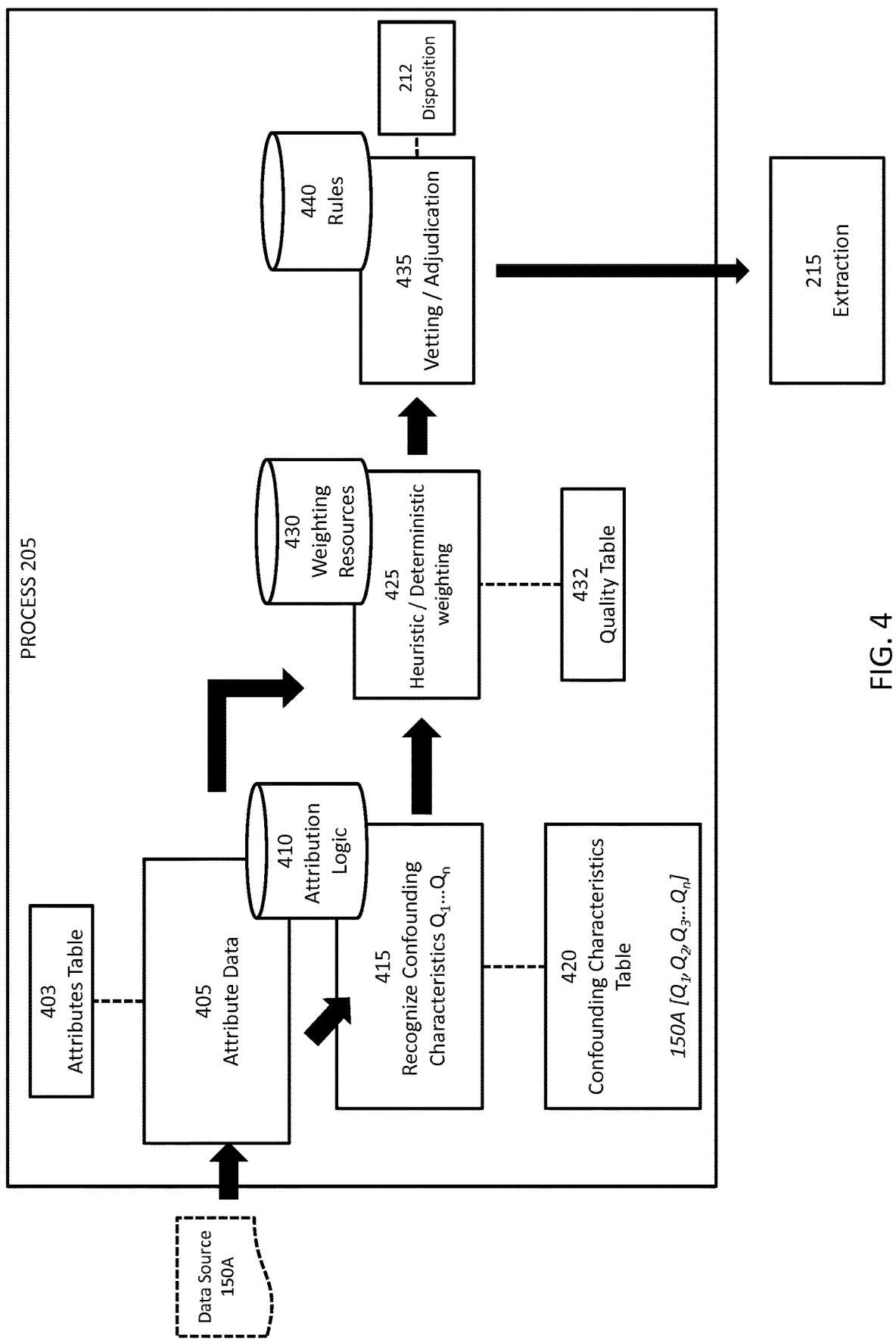
FIG. 4 is a functional block diagram of a process that is a part of the method shown in FIG. 2.

FIG. 4 is a functional block diagram of process 205. Process 205 commences with processes 405.

Process 405 receives data from data source 150A, and attributes data source 150A using rules and reference information stored in attribution logic 410, thus producing an attributes table 403. The rules and reference information are, for example, a set of algorithms that scan data to determine if the data is text or multimedia. For example, process 405 analyses data source 150A, and determines that it is a third party, e.g., purchased, data source and that its creation date is 1 Jan. 2015.

TABLE 1 is an exemplary representation of attributes table 403, and includes several exemplary attributes and values thereof

TABLE 1

(Example of Attributes Table 403)

| ATTRIBUTE | VALUE |
| --- | --- |
| File Type | Text |
| Delimited | Yes |
| Source (Author from file Properties) | ACME Data Files |
| Format | DFC001 |
| Create Date: | 1 January 2015 |
| Web Discovery ID: | - not present - |
| Encoding | UTF-8 |
| Scripts detected | C0 Controls and Basic Latin |

"File Type" is a Source Level attribute and is a determination made as the results of a process that scans the metadata and content of a data file in order to characterize the data type of the file. Other values might be "image", "video", "binary", "unknown" and so on.

"Delimited" is a yes/no flag that represents a conclusion made upon scanning of a file to determine if data is contained in discretely separated rows.

"Source", in the example, represents the supplier of the file; in this case read from the "author" metadata (or "properties") of the data file.

"Create Date" may also be read from the file's metadata.

"Web Discovery ID" is presented as an example of an attribute that is not found, being an explicit marker inserted into a file by a discovery process initiated by function 210 (described below).

"Encoding" is also read from file metadata and refers to characterization of the way a file was constructed. Other values might include "ASCII", "BIG5", "SHIFT-JIS, "EBCDIC" and so on.

"Scripts Detected" is provided in the example to show an attribute that is not derived from metadata, but from scanning of the corpus of the data itself, in order to understand what Unicode ranges are present in the file. The value of "C0 Controls and Basic Latin" is actually the standard Latin data set.

The attribute types and values shown TABLE 1 are only examples, and do not necessarily represent the attribute types or values that system 100 will attach to a particular file or data. System 100 can be configured to create any metadata that is deemed to be useful.

Process 415 analyses the corpus of data source 150A in order to generate attributes across numerous dimensions, including (but not limited to):
 a) Entity extraction
 b) Semantic disambiguation
 c) Sentiment analysis
 d) Language extraction
 e) Basic metadata Process 415 also attributes and measures the presence and prevalence of "confounding characteristics" in data source 150A, and thus produces a confounding characteristics table 420 that lists confounding characteristics Q1, Q2, Q3 . . . Qn. Several examples of confounding characteristics are mentioned above.

TABLE 2 is an example of confounding characteristics table 420, and includes several examples of metrics and values thereof

TABLE 2

(Example of Confounding Characteristics Table 420)

| METRIC | VALUE |
| --- | --- |
| Neologism prevalence | AX2 |
| Grammar variance | 0.56 |
| Punctuation score | 0 |
| Sentiment | −0.5 |
| Spelling idiosyncrasy | LOW |
| Obfuscation score | 0 |
| Media homogeneity | 1.0 |
| Fragment Variance | 0.01 |

In the example in TABLE 2, the scale and range of values are independent. Some may be numeric, other may be codes that require non-arithmetic means to produce actionable scores.

Note that the measures of confounding characteristics listed and illustrated herein are completely independent, and the class not a closed one, in that the system will have the ability to add new confounding characteristics as they are identified. For example, in TABLE 2 above there is no entry for "polylingual data" because the measures for and impact of this confounding characteristic have yet to be identified in the example implementation of the system.

"Neologism prevalence" represents a score calculated from scanning the instance of data source 150A and generating a score that measures how many neologisms, i.e., new and/or unconventional words, are present in the corpus of data source 150A. In this example, "AX2" might represent overwhelming presence of neologisms which are well-understood, "ZA9" might represent scarcity of neologisms, but prevalence within that set of very unusual or unrecognized neologisms.

"Grammar variance" is a measure of the uniformity of grammar style. Algorithms used to establish the metric may be industry-standard approaches such as the Cocke-Younger-Kasami algorithm, or custom-built algorithms and measures, or an algorithm that combines several measures. These sub-measures may themselves be stored as metrics in confounding characteristics table 420, and then combined to produce other entries in confounding characteristics table 420.

"Punctuation score" is a measure of presence of punctuation. In this example, there is little or negligible punctuation detected, hence the value of zero for this metric.

"Sentiment" shows whether the "speaker" in text is conveying positive sentiment about the subject matter (that is, approval, recommendation, approbation etc), negative sentiment (that is, criticism or disapproval), or neutral sentiment (neither positive or negative, or possibly indeterminate). A negative number indicates negative sentiment (criticism), zero indicates a neutral sentiment, and a positive number indicates a positive sentiment (endorsement). The example value for Sentiment here is −0.5 indicating what might be described as "moderately negative sentiment".

"Spelling idiosyncrasy" is a measure of the prevalence of misspellings that are not recognized neologisms. The value of "LOW" here indicates a low rate of misspellings. Note that "misspellings" is used here simply to indicate deviation from known lexica; a "HIGH" score may indicate, for example, a high prevalence of proper nouns that are not recognized, rather than true typographical or spelling errors.

"Obfuscation score" is a measure of the degree to which it appears that deliberate attempts have been made to hide meaning—encryption of text would be a simple example of this. The value here is zero, indicating no obfuscation detected.

"Media homogeneity" indicates whether the data appears to be a single type of data (e.g., text), or mixed media (e.g., text with embedded images or hyperlinks). In this example, the score is 1.0, which indicates that the file is one type of media only. This information may be coupled by process 435 (described below) with attributes derived by process 405 and shown in TABLE 1 to conclude that the example data file is comprised completely of structured columnar text.

"Fragment Variance" is a score from 0 to 1 that describes the overall consistency in size of discrete units of the file. In TABLE 2, the score of 0.01 indicates that the fragments are very uniform. The example is of a very structured data file, so this is an expected value because the fragments will represent lines in the file. A file full of messages from an online social networking service that enables users to send and read short, e.g., 140-character, messages might have a medium score, because the fragments will vary but tend to be around 128 characters. For data from a social networking service that allows larger posts, the fragments could be expected to have a very high score as there is massive variability possible in this kind of data.

The metrics and values shown TABLE 2 are only examples, and do not necessarily represent the values that system 100 will attach to a particular file or data.

As stated above, process 415 may have regard to numerous measures for each metric. For example, several algorithms may be employed to measure the value of the "Grammar variance" metric. For example, one or more the measures may actually be other metrics in confounding characteristics table 420, others may be or be derived using values in attributes table 403.

TABLE 3, below, shows three examples of algorithmic measures of Sentiment. These measures could be combined into the overall Sentiment score above in TABLE 2.

TABLE 3

(Example list of algorithmic Measures of Sentiment Confounding Characteristic)
METRIC Simple Mean of Sentiment
Weighted Mean of Sentiment
Standard Deviation of Sentiment After completing processes 405 and 415, process 205 proceeds to process 425.

Process 425 is a heuristic/deterministic weighting process that receives attributes table 403 and confounding characteristics table 420, and calculates qualitative measures to the attributes listed in attributes table 403 and confounding characteristics table 420, thus producing a quality table 432. The qualitative measures in quality table 432 are generated with reference to weighting resources 430, and may be scores, coefficients or weightings that measure data source 150A across numerous dimensions.

TABLE 4 is an exemplary representation of quality table 432. In TABLE 4, the "weight" is the qualitative measure, and is obtained from weighting resources 430. Process 425 assigns the weight to the metric.

TABLE 4

(Example of Quality Table 432)

| METRIC | VALUE | WEIGHT |
|---|---|---|
| Neologism prevalence | AX2 | 10 |
| Grammar variance | 0.56 | 50 |
| Punctuation score | 0 | 1 |
| Sentiment | −0.5 | 77 |
| Spelling idiosyncrasy | LOW | 30 |
| Obfuscation score | 0 | 70 |
| Media homogeneity | 1.0 | 60 |
| Fragment Variance | 0.01 | 44 |
| Languages | 1 | 80 |
| Source | S1 | 55 |
| Age | 76 | 44 |

TABLE 4 is a simple example. The actual qualitative measurements may have regard to quite complex combinations of factors.

TABLE 4A shows an example of the use of combined factors.

TABLE 4A

| METRIC | VALUE | WEIGHT |
|---|---|---|
| Source | S1 | 10 |
| Source > Age | S1: 25 | 76 |

In the example in TABLE 4A, the metric of Source has been looked up in another table (not shown) that lists known data sources and the weights assigned respectively to those data sources. The weight to this Source, recognized as source "S1" and assigned by process 425 in this case, is 10. Process 425 is, however, able to calculate weights of a more complex nature. The "Source>Age" weight (indented to show that it is in the "Source" family of weights) shows that there is another weight that operates for the source S1 and that applies a particular coefficient (namely 25) based on age of data in source S1 (that is, how long ago the file was created or alternatively an explicitly specified date if present) to yield a Weight of 76.

After completing process 425, process 205 proceeds to process 435.

Process 435 is a vetting/adjudication process that receives quality table 432, confounding characteristics table 420 and attributes table 403, and uses rules 440 to adjudicate the appropriate disposition of data source 150A, and thus produces disposition 212. Rules 440 may take the form of matrices, lookup tables, scorecards, non-deterministic finite state automata, decision trees or any combination of these or other decisioning logic.

Disposition 212 may include instructions or advisories to:
a) Set a rule that files analogous to data source 150A be ingested in toto.
b) Divide up files from data source 150A and ingest only parts that meet certain criteria.
c) Ingest entire file from data source 150A, but flag data with a source-specific quality level indicator.
d) Set a rule that files from data source 150A always be rejected.
e) Tentatively ingest files from data source 150A but hold them pending additional corroboration, and trigger targeted web discovery via function 210.

Note also that the example of table 432 shown in TABLE 4 is a two-dimensional reference table with values and weights, but this is exemplary only. Process 435 may, via rules 440, employ other processes, such as table-driven lookups and non-deterministic finite state automata in order to achieve disposition 212.

Referring again to FIG. 2, after completing process 205, method 200 proceeds to process 215.

Process 215 receives data in the form of data source 150A and disposition 212, and executes processes to subdivide and filter the received data, to yield extracted data 217. In this regard, process 215 uses the data generated by process 205, i.e., disposition 212, to:
a) qualify data source 150A;
b) divide the content of data source 150A into meaningful subsets; and
c) ingest data from data source 150A into a downstream process (not shown), being the consumer(s) of the data.

Process 220 receives extracted data 217, and transmits extracted data 217 to a downstream process (not shown).

Method 200 also executes a function 225 to generate experiential, e.g., statistical, and qualitative, e.g., user acceptance, feedback and return the feedback to process 205, in order to improve process 205. Function 225 is informed by (i.e., takes inputs from) disposition 212, quality table 432, confounding characteristics table 420 and attributes table 403. Function 225 is triggered by the processing of disposition 212 by process 215.

Method 200 also executes a function 210 as an asynchronous and potentially continuous process. Function 210 explores new and existing data sources 150, e.g., via automated web discovery, using data generated in process 205, namely disposition 212, quality table 432, confounding characteristics table 420 and attributes table 403. This data will be inputs to function 210 in order to trigger, guide or constrain automated data source discovery processes. This intelligence may, for example, take the form of "gap identification" (which identifies areas where data in the hitherto ingested corpus has been observed to be inter alia deficient, of low quality, or diminishing value due to "aging out"), or "analogue generation" (which targets data source classes based on identification of similar or analogous classes of data sources and determination of efficacy, consistency or veracity of the classes).

Function 210 configures and executes external data discovery routines, applications and functions. Function 210 provides inputs to these data discovery processes so that they serve to augment the data previously received by method 200. An example of such inputs is a Uniform Resource Locator (URL) of a website from which desired data can be obtained, and a list of search terms based on content of data source 150A.

System 100 allows for automated, configurable, repeatable and adaptive exploitation of new data sources, especially unstructured data. Because system 100 is completely automated at run-time, it is scalable, and thus allows for massively increased efficiency, speed and consistency in data intake management.

To illustrate an example of execution of method 200, we shall begin with source file EX1, shown below in TABLE 5.

TABLE 5

(Source File EX1)

| ID | E-mail Address | Date and Time | Message |
| --- | --- | --- | --- |
| funkyDave | dave.smith@gmail.com | 2015-01-02 22:23:45:660 | Gah! Dnt u just luv it when they leave half the toppings off ur pizza? |
| 2PacGlue | Fnky2rtm@yahoo7.com.au | 2015-02-02 22:25:05:424 | Gonna try the new Coke flavor. NOT. |

TABLE 6 shows attributes table 403 for source file EX1.

TABLE 6

(Example of attributes table 403 for source file EX1)

| ATTRIBUTE | VALUE |
| --- | --- |
| File Type | Text |
| Delimited | Yes |
| Source | GNIP |
| Format | GNIP01 |
| Create Date: | 1 July 2015 |
| Encoding | UTF-8 |

TABLE 7 shows confounding characteristics table 420 for source file EX1.

TABLE 7

(Example of confounding characteristics
table 420 for source file EX1)

| METRIC | VALUE |
|---|---|
| Neologism prevalence | AG7 |
| Grammar variance | 0.88 |
| Punctuation score | 55 |
| Sarcasm/Sincerity Range | −3 |
| Sentiment | −0.95 |
| Spelling idiosyncrasy | HIGH |
| Obfuscation score | 0 |
| Media homogeneity | 1.0 |

In the population of confounding characteristics table 420 to the data fragment "Gonna try the new Coke flavor. NOT.", process 415 will perform analysis including semantic analysis of the content along the lines presented in TABLE 8.

TABLE 8

(Example of analysis performed to populate
confounding characteristics table 420)

| Word | Analysis |
|---|---|
| Gonna | This is likely a statement of intent about future action. |
| try | "Gonna" neologism literally means "Going to" but is used to indicate "I think I will". |
| the | This is the subject matter of the sentence. |
| new | Product identified: |
| Coke | Unlikely to be "New Coke", very likely to be some new |
| flavor | unspecified flavor? Conclusion: Coke has a new product. |
| NOT | Classic negating neologism - confirmed by all caps representation.<br>Very likely to indicate sarcasm, as well as literal opposite of previous statement. |

The analysis presented in TABLE 8 is a "plain English" deconstruction of algorithmic and statistical analysis performed by process 415. This analysis would be used to populate Neologism prevalence, because the words "Gonna" and "NOT" are neologisms in the way they are used, but are not actually new words per se. This also shows why the score for Neologism prevalence is not just a simple number. Neologism is both about new words and new uses of old words. Punctuation score will also be affected by the use of punctuation in the example, i.e., periods and capitalization are used consistently. Sarcasm/Sincerity Range is very relevant here and is influenced heavily by the use of "NOT" to both negate the preceding statement and indicate sarcasm. This data has very low sincerity as a whole, although the total construct is "sincere" in that it is intended to clearly convey a negative intention.

Note that the analysis presented in TABLE 8 is "shorthand" created for the purposes of this example. Process 415 will use multiple sophisticated functions to isolate phrases, perform semantic analysis, and compensate for confounding characteristics. Note also that process 415 performs analysis and records results across an entire file or data source.

TABLE 9 shows the result of Quality Table 432 with resultant "percentage scores" for source file EX1 shown in the rightmost column, in order to allow a simplistic representation of the execution of process 435 and rules 440. In practice, the calculation processes and algorithms will be configurable and generally far more complex than the example in TABLE 9.

TABLE 9

(Example of quality table 432 for source file EX1)

| METRIC | VALUE | WEIGHT | SCORE |
|---|---|---|---|
| Neologism prevalence | AG7 | 10 | 34 |
| Grammar variance | 0.88 | 50 | 44 |
| Punctuation score | 55 | 1 | 55 |
| Sarcasm/Sincerity Range | −3 | 77 | 23 |
| Sentiment | −0.95 | 30 | 33 |
| Spelling idiosyncrasy | HIGH | 70 | 80 |
| Obfuscation score | 0 | 60 | 0 |
| Media homogeneity | 1.0 | 44 | 44 |
| Languages | 1 | 80 | 80 |
| Source | S1 | 55 | 23 |
| Age | 76 | 44 | 50 |

TABLE 10 shows a "plain English" interpretation of disposition 212.

TABLE 10

(Example of disposition 212 for source file EX1)

| | | |
|---|---|---|
| 1 | Use as original seed record | FALSE |
| 2 | Use as corroboration record | TRUE |
| 3 | Match to Business database | FALSE |
| 4 | Match to Contact database | TRUE |
| 5 | Primafacie Veracity Index | 0.1 |
| 6 | Use as seed for automated discovery | FALSE |
| 7 | Use as seed for [Method 100] rules tuning | TRUE |

Note that in TABLE 10, entry 6 indicates that function 210 will not be triggered by this data (or data from this source in future), and entry 7 indicates that function 225 will be seeded by data generated in method 100 as it processed source file EX 1.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method comprising:
   (a) receiving data from a first data source;
   (b) performing a source analysis process that includes:
   attributing said first data source at a context level, a source file level, and a content level, in accordance with rules, thus yielding an attribute of said first data source;
   analyzing said data to identify a characteristic of said data that confounds a meaning of said data, thus yielding a confounding characteristic;
   calculating a qualitative measure of said attribute of said first data source, thus yielding a weighted attribute of said first data source;

calculating a qualitative measure of said confounding characteristic, thus yielding a weighted confounding characteristic; and analyzing said weighted attribute of said first data source and said weighted confounding characteristic, to produce a disposition that includes disposition instructions;

(c) processing said data in accordance with said disposition instructions, thus yielding extracted data;

(d) transmitting said extracted data to a downstream process;

(e) determining, based on said weighted attribute of said first data source and said weighted confounding characteristic, to use said first data source as a seed of an automated data source discovery process;

(f) executing said automated data discovery process using search terms based on content of said first data source to discover a second data source; and (g) performing said source analysis process on data from said second data source.

2. The method of claim 1, further comprising:
generating feedback based on said disposition; and
improving said method based on said feedback.

3. The method of claim 1, wherein said analyzing is performed in a dimension selected from the group consisting of entity extraction, semantic disambiguation, sentiment analysis, language extraction, linguistic transformation, and basic metadata.

4. The method of claim 1, wherein said confounding characteristic is selected from the group consisting of sarcasm, neologism, grammar variation, inappropriately phrased text, punctuation, polylingual data, spelling, obfuscation, encryption, context, and use of a combination of media.

5. The method of claim 1, wherein said disposition is selected from the group consisting of:

(a) set a rule that files analogous to said first data source be taken in and stored in toto, (b) divide up files from said first data source and take in and store only parts that meet certain criteria, (c) take in and store an entire file from said first data source, but flag data with a source-specific quality level indicator, (d) set a rule that files from said first data source always be rejected, and (e) tentatively take in and store files from said first data source, but hold them pending additional corroboration.

6. A system comprising:
a processor; and
a memory that contains instructions that are readable by said processor to cause said processor to:

(a) receive data from a first data source;

(b) perform a source analysis process in which said instructions cause said processor to:

attribute said first data source at a context level, a source file level, and a content level, in accordance with rules, thus yielding an attribute of said first data source;

analyze said data to identify a characteristic of said data that confounds a meaning of said data, thus yielding a confounding characteristic;

calculate a qualitative measure of said attribute of said first data source, thus yielding a weighted attribute of said first data source;

calculate a qualitative measure of said confounding characteristic, thus yielding a weighted confounding characteristic; and analyze said weighted attribute of said first data source and said weighted confounding characteristic, to produce a disposition that includes disposition instructions;

(c) process said data in accordance with said disposition instructions, thus yielding extracted data;

(d) transmit said extracted data to a downstream process;

(e) determine, based on said weighted attribute of said first data source and said weighted confounding characteristic, to use said first data source as a seed of an automated data source discovery process;

(f) execute said automated data discovery process using search terms based on content of said first data source to discover a second data source; and (g) perform said source analysis process on data from said second data source.

7. The system of claim 6, wherein said instructions also cause said processor to:
generate feedback based on said disposition; and
improve said method based on said feedback.

8. The system of claim 6, wherein said instructions that cause said processor to analyze said data cause said processor to analyze said data in a dimension selected from the group consisting of entity extraction, semantic disambiguation, sentiment analysis, language extraction, linguistic transformation, and basic metadata.

9. The system of claim 6, wherein said confounding characteristic is selected from the group consisting of sarcasm, neologism, grammar variation, inappropriately phrased text, punctuation, polylingual data, spelling, obfuscation, encryption, context, and use of a combination of media.

10. The system of claim 6, wherein said disposition is selected from the group consisting of:

(a) set a rule that files analogous to said first data source be taken in and stored in toto, (b) divide up files from said first data source and take in and store only parts that meet certain criteria, (c) take in and store an entire file from said first data source, but flag data with a source-specific quality level indicator, (d) set a rule that files from said first data source always be rejected, and (e) tentatively take in and store files from said first data source, but hold them pending additional corroboration.

11. A non-transitory computer readable storage medium, comprising instructions that are readable by a processor to cause said processor to:

(a) receive data from a first data source;

(b) perform a source analysis process in which said instructions cause said processor to:

attribute said first data source at a context level, a source file level, and a content level, in accordance with rules, thus yielding an attribute of said first data source;

analyze said data to identify a characteristic of said data that confounds a meaning of said data, thus yielding a confounding characteristic;

calculate a qualitative measure of said attribute of said first data source, thus yielding a weighted attribute of said first data source;

calculate a qualitative measure of said confounding characteristic, thus yielding a weighted confounding characteristic; and analyze said weighted attribute of said first data source and said weighted confounding characteristic, to produce a disposition that includes disposition instructions;

(c) process said data in accordance with said disposition instructions, thus yielding extracted data;

(d) transmit said extracted data to a downstream process;

(e) determine, based on said weighted attribute of said first data source and said weighted confounding characteristic, to use said first data source as a seed of an automated data source discovery process;

(f) execute said automated data discovery process using search terms based on content of said first data source to discover a second data source; and (g) perform said source analysis process on data from said second data source.

12. The non-transitory computer readable storage medium of claim 11, wherein said instructions also cause said processor to:

generate feedback based on said disposition; and
improve said method based on said feedback.

13. The non-transitory computer readable storage medium of claim 11, wherein said instructions that cause said processor to analyze said data cause said processor to analyze said data in a dimension selected from the group consisting of entity extraction, semantic disambiguation, sentiment analysis, language extraction, linguistic transformation, and basic metadata.

14. The non-transitory computer readable storage medium of claim 11, wherein said confounding characteristic is selected from the group consisting of sarcasm, neologism, grammar variation, inappropriately phrased text, punctuation, polylingual data, spelling, obfuscation, encryption, context, and use of a combination of media.

15. The non-transitory computer readable storage medium of claim 11, wherein said disposition is selected from the group consisting of:

(a) set a rule that files analogous to said first data source be taken in and stored in toto, (b) divide up files from said first data source and take in and store only parts that meet certain criteria, (c) take in and store an entire file from said first data source, but flag data with a source-specific quality level indicator, (d) set a rule that files from said first data source always be rejected, and (e) tentatively take in and store files from said first data source, but hold them pending additional corroboration.

* * * * *